(12) United States Patent
Kyoun et al.

(10) Patent No.: US 11,290,771 B2
(45) Date of Patent: Mar. 29, 2022

(54) DISPLAY DEVICE FOR DISPLAYING VARIOUS TYPES OF CONTENTS

(71) Applicant: Samsung Electronics Co., Ltd., Suwon-si (KR)

(72) Inventors: Jaeki Kyoun, Suwon-si (KR); Heejin Ko, Suwon-si (KR); Hyunjee Kwak, Suwon-si (KR); Sunyoung Kim, Suwon-si (KR); Seungmin Lee, Suwon-si (KR); Yoojin Choi, Suwon-si (KR); Jeonghye Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 279 days.

(21) Appl. No.: 16/713,788

(22) Filed: Dec. 13, 2019

(65) Prior Publication Data

US 2020/0213660 A1    Jul. 2, 2020

(30) Foreign Application Priority Data

Jan. 2, 2019   (KR) .................. 10-2019-0000231

(51) Int. Cl.
*H04N 21/431* (2011.01)
*H04N 21/422* (2011.01)
(Continued)

(52) U.S. Cl.
CPC ... *H04N 21/4312* (2013.01); *H04N 21/42202* (2013.01); *H04N 21/4438* (2013.01); *H04N 21/8173* (2013.01)

(58) Field of Classification Search
CPC ......... H04N 21/4312; H04N 21/42202; H04N 21/4438; H04N 21/8173
See application file for complete search history.

(56) References Cited

U.S. PATENT DOCUMENTS 3,994,079 A    11/1976   Mirman
7,665,033 B2   2/2010    Byrne et al.
(Continued)

FOREIGN PATENT DOCUMENTS

EP          2224731       9/2010
KR    10-2015-0044167     4/2015

OTHER PUBLICATIONS

Extended European Search Report dated Apr. 1, 2020 in European Patent Application No. 19219271.4.
(Continued)

*Primary Examiner* — Chenea Davis
(74) *Attorney, Agent, or Firm* — Staas & Halsey LLP (57) ABSTRACT

A display device includes a display configured to output a broadcast content or a content for an interior decoration function, a memory storing a first layout for surrounding the broadcast content and a second layout for surrounding the content for the interior decoration function, and a processor operatively connected to the display and the memory, wherein the processor removes the first layout, enlarges the broadcast content, and outputs the enlarged broadcast content through the display based on a first user input, and enlarges portions of the content for the interior decoration function and of the second layout and outputs the enlarged portions of the content for the interior decoration function and of the second layout through the display based on a second user input.

20 Claims, 7 Drawing Sheets

(51) Int. Cl.
   *H04N 21/443*      (2011.01)
   *H04N 21/81*       (2011.01)

(56) References Cited

U.S. PATENT DOCUMENTS

| | | | |
|---|---|---|---|
| 10,049,644 B2 | 8/2018 | Vukicevic | |
| 2003/0234804 A1* | 12/2003 | Parker | H04N 21/42204 |
| | | | 715/719 |
| 2005/0268252 A1 | 12/2005 | Parker et al. | |
| 2006/0181645 A1* | 8/2006 | Sarika | H04N 21/458 |
| | | | 348/563 |
| 2007/0003221 A1* | 1/2007 | Hamada | H04N 9/8227 |
| | | | 386/230 |
| 2007/0206923 A1 | 9/2007 | Murakoshi et al. | |
| 2010/0023969 A1 | 1/2010 | Pan et al. | |
| 2013/0201407 A1 | 8/2013 | Parker et al. | |
| 2014/0123183 A1* | 5/2014 | Fujimoto | H04N 21/4221 |
| | | | 725/37 |
| 2015/0279115 A1 | 10/2015 | Vukicevic | |
| 2017/0045936 A1 | 2/2017 | Kakapuri | |
| 2018/0275856 A1 | 9/2018 | Apitz et al. | |
| 2020/0288199 A1* | 9/2020 | Seo | H04N 21/4854 |

OTHER PUBLICATIONS

International Search Report and Written Opinion of the International Searching Authority dated Apr. 3, 2020 in International Patent Application No. PCT/KR2019/017473.
LG OLED TV Review, Naver blog, Feb. 26, 2018, Retrieved from https://blog.naver.com/gpsk1988/221216958211,32 pages.

\* cited by examiner

DISPLAY DEVICE FOR DISPLAYING VARIOUS TYPES OF CONTENTS

CROSS-REFERENCE TO RELATED APPLICATION(S)

This application is based on and claims priority under 35 U.S.C. § 119 to Korean Patent Application No. 10-2019-0000231, filed on Jan. 2, 2019, in the Korean Intellectual Property Office, the disclosure of which is incorporated by reference herein its entirety.

BACKGROUND

1. Field

The disclosure relates to a display device for outputting various types of contents.

2. Description of the Related Art

As a display device has come into wide use, each household has at least one display device. Typically, the display device is disposed on one wall of a living room, and a user may watch a TV program, a movie, and the like through the display device.

The above information is presented as background information only to assist with an understanding of the disclosure. No determination has been made, and no assertion is made, as to whether any of the above might be applicable as prior art with regard to the disclosure.

SUMMARY

When a size of a display device is large, it may not be easy to utilize a wall face for various purposes. For example, when the size of the display device is large, the display device and a picture may not be placed together on the wall. In particular, when the display device provides only a video content such as a TV program, a user may not utilize the wall face and the display device for various purposes. Accordingly, a utility of the display device may be reduced, and unnecessary space may occur in the home.

Aspects of the disclosure are to address at least the above-mentioned problems and/or disadvantages and to provide at least the advantages described below. Accordingly, an aspect of the disclosure is to provide a display device including a display configured to output a broadcast content or a content for an interior decoration function, a memory storing a first layout for surrounding the broadcast content and a second layout for surrounding the content for the interior decoration function, and a processor operatively connected to the display and the memory, wherein the processor removes the first layout, enlarges the broadcast content, and outputs the enlarged broadcast content through the display based on that a first user input for enlarging the broadcast content is received in a first mode outputting the broadcast content and the first layout through the display, and enlarges portions of the content for the interior decoration function and of the second layout and outputs the enlarged portions of the content for the interior decoration function and of the second layout through the display based on that a second user input for enlarging the content for the interior decoration function is received in a second mode outputting the content for the interior decoration function and the second layout through the display.

Another aspect of the disclosure is to provide a display device including a display configured to output a broadcast content or a content for an interior decoration function, a memory storing a layout forming a background of the broadcast content and of the content for the interior decoration function, and a processor operatively connected to the display and the memory, wherein the processor removes the layout, enlarge the broadcast content, and outputs the enlarged broadcast content through the display based on that a first user input for enlarging the broadcast content is received in a first mode outputting the broadcast content and the layout through the display, and removes a portion of the layout, enlarges a portion of the content for the interior decoration function and a portion of the remaining layout, and outputs the enlarged portions of the content for the interior decoration function and of the remaining layout through the display based on that a second user input for enlarging the content for the interior decoration function is received in a second mode outputting the content for the interior decoration function and the layout through the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure may be described with reference to accompanying drawings. However, this is not intended to limit the disclosure to any particular embodiment, but should be understood to include various modifications, equivalents, and/or alternatives of embodiments of the disclosure. In connection with the description of the drawings, similar reference numerals may be used for similar components.

Figure 1:
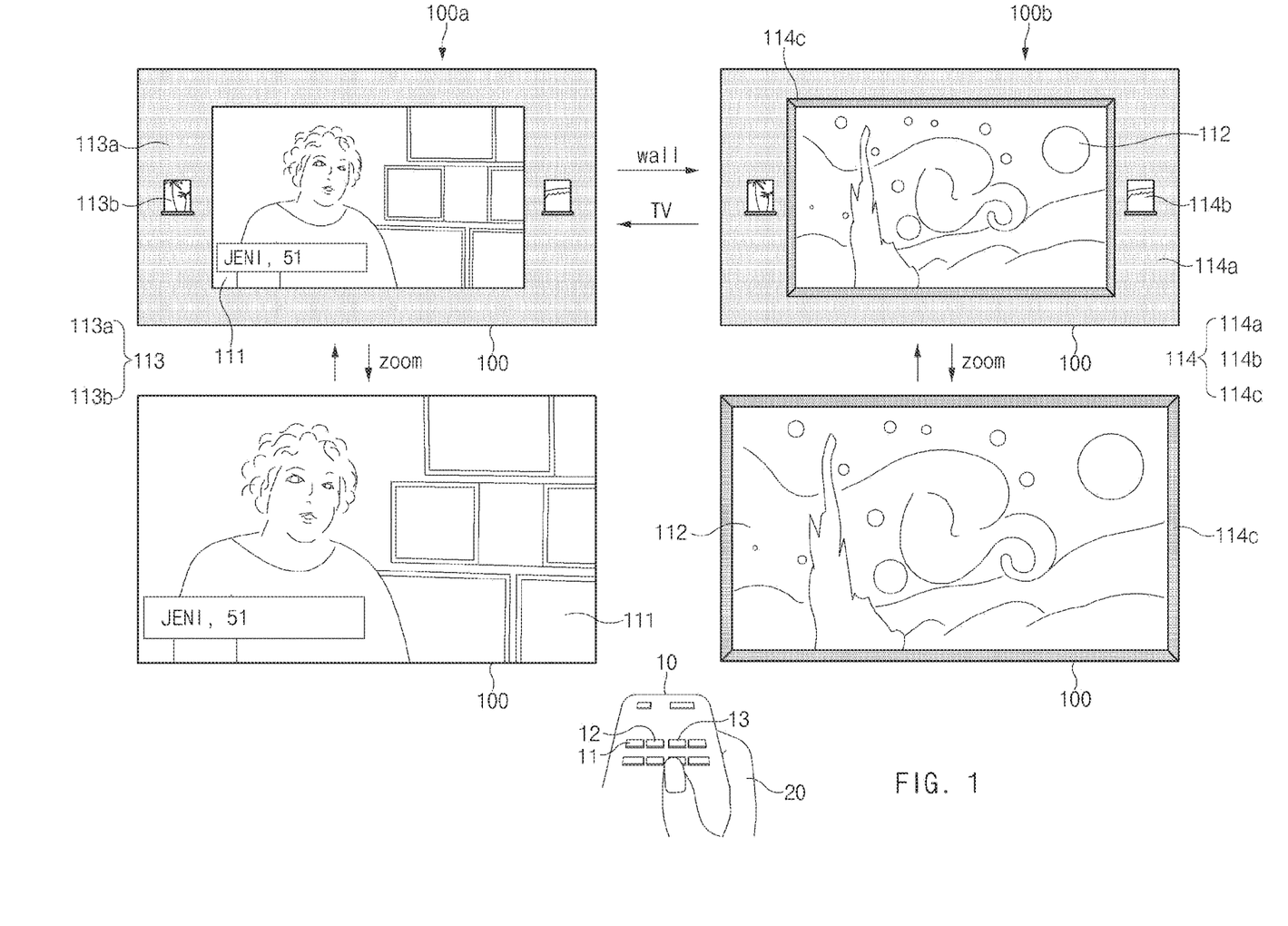
FIG. 1 illustrates a display device according to an embodiment.

FIG. 1 illustrates a display device according to an embodiment.

Referring to FIG. 1, a display device 100 may output a broadcast content 111, a content 112 for an interior decoration function, a first layout 113, and/or a second layout 114. The broadcast content 111, which is a content received from an external device (e.g., a set-top box, a smart phone, or a broadcasting station), may include, for example, a TV program, a movie, and various applications. The content 112 for the interior decoration function, which is a content for enabling the display device 100 to be utilized as an interior decoration, an artwork, an ornament, or the like, may include, for example, a photo, a picture, and the art work. The content 112 for the interior decoration function may be stored in the display device 100, or may be received from the external device.

The first layout 113, which is a content for forming a background of the broadcast content 111, may surround the broadcast content 111. For example, the first layout 113 may include a wallpaper image 113a surrounding the broadcast content 111 and a frame image 113b disposed on the wallpaper image 113a. The second layout 114, which is a content for forming a background of the content 112 for the interior decoration function, may surround the content 112 for the interior decoration function. For example, the second layout 114 may include a wallpaper image 114a, a frame image 114b disposed on the wallpaper image 114a, and an edge image 114c surrounding the content 112 for the interior decoration function. In FIG. 1, the first layout 113 and the second layout 114 are illustrated as different layouts, but the first layout 113 and the second layout 114 may be the same.

According to one embodiment, the display device 100 may receive a user input from a remote controller 10. The remote controller 10, which is a component for a user 20 to control the display device 100, may include a plurality of buttons 11, 12, and 13. The user 20 may execute various functions provided by the display device 100 through the plurality of buttons 11, 12, and 13. In the disclosure, the remote controller 10 may be referred to as a remote controller.

For example, when the user 20 presses a first button 11, the display device 100 may operate in a first mode 100a. The first mode 100a may refer to a state in which the display device 100 outputs the broadcast content 111 and the first layout 113. In the first mode 100a, the user 20 may watch a TV program, a movie, or the like through the display device 100.

In the first mode 100a, when the user 20 wants to watch the broadcast program through a full screen, the user 20 may enlarge the broadcast content 111 through a third button 13. In this case, the display device 100 may remove the first layout 113 and enlarge and output the broadcast content 111. When the broadcast content 111 is enlarged, the user 20 may watch the TV program, the movie, and the like through the full screen. In the disclosure, the first button 11 may be referred to as a TV button, and the third button 13 may be referred to as a zoom button.

In another embodiment, when the user 20 presses a second button 12, the display device 100 may operate in a second mode 100b. The second mode 100b may refer to a state in which the display device 100 may output the content 112 for the interior decoration function and the second layout 114. In the second mode 100b, the user 20 may not only enjoy the photo, the picture, or the like through the display device 100, but also use the display device 100 as an interior decoration.

In addition, when the user 20 wants to enjoy the photo, picture, or the like through the full screen, the user 20 may press the third button 13 (or the zoom button) to enlarge the content 112 for the interior decoration function. In this case, the display device 100 may delete the remaining images other than the edge image 114c of the second layout 114, and enlarge and output the edge image 114c and the content 112 for the interior decoration function. In the disclosure, the second button 12 may be referred to as a wall button.

In another embodiment, the user 20 may change the broadcast content 111 to the content 112 for the interior decoration function, and change the content 112 for the interior decoration function to the broadcast content 111. For example, when the user 20 presses the second button 12 in the first mode 100a, the display device 100 may change the broadcast content 111 to the content 112 for the interior decoration function. In this case, the first layout 113 may be maintained, or the first layout 113 may be changed to the second layout 114.

In another example, when the user 20 presses the first button 11 in second mode 100b, the display device 100 may change the content 112 for the interior decoration function to the broadcast content 111. In this case, the second layout 114 may be maintained, or the second layout 114 may be changed to the first layout 113.

According to a comparative example, because the display device may output only the broadcast content 111 or the content 112 for the interior decoration function, the display device may not be used for various applications. However, according to one embodiment of the disclosure, because the display device 100 may output various types of contents, the user 20 may use the display device 100 as the interior decoration, the ornament, or the artwork as well as a TV.

Figure 2:
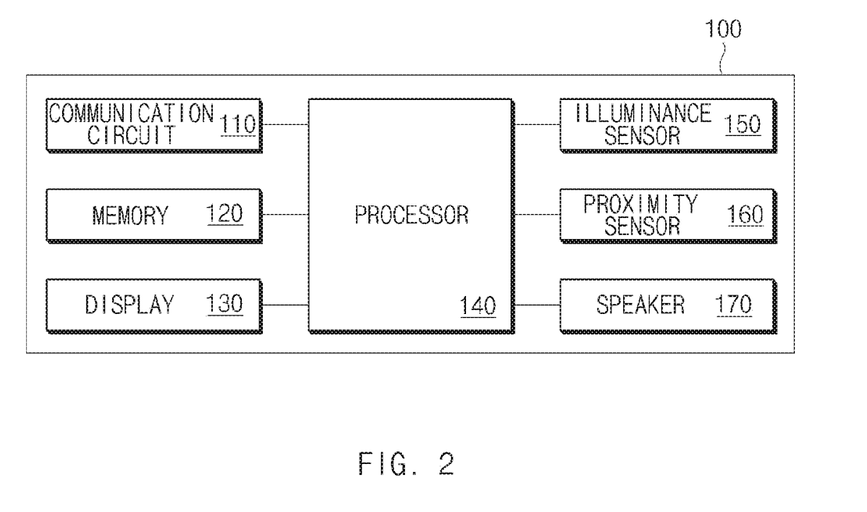
FIG. 2 illustrates a block diagram of a display device according to an embodiment.

FIG. 2 illustrates a block diagram of a display device according to an embodiment. FIG. 2 illustrates a block diagram of hardware components included in the display device 100 illustrated in FIG. 1. In the disclosure, descriptions of FIGS. 1 and 2 may be equally applicable to components having the same reference numerals as those in the display device 100 illustrated in FIGS. 1 and 2.

Referring to FIG. 2, the display device 100 may include a communication circuit 110, a memory 120, a display 130, a processor 140, an illuminance sensor 150, a proximity sensor 160, and a speaker 170. According to one embodiment, the display device 100 may include only at least some of the components shown in FIG. 2. For example, the display device 100 may include only the memory 120, the display 130, and the processor 140.

The communication circuit 110 may receive the broadcast content 111 and/or the content 112 for the interior decoration function from the external device. For example, the communication circuit 110 may receive the TV program from the set-top box, and may receive the photo and a video from the smart phone, a camera, or the like. According to one embodiment, the communication circuit 110 may receive the user input from the remote controller 10. In the disclosure, the communication circuit 110 may be referred to as a communication interface.

The memory 120 may store the broadcast content 111, the content 112 for the interior decoration function, the first layout 113, and/or the second layout 114. For example, the memory 120 may store the TV program received from the communication circuit 110, or may store the photo and the video received from the smartphone, the camera, or the like. As another example, the memory 120 may store the first layout 113 and the second layout 114 shown in FIG. 1.

The display 130 may output at least one of the broadcast content 111, the content 112 for the interior decoration function, the first layout 113, and/or the second layout 114. For example, as shown in FIG. 1, the display 130 may output the broadcast content 111 and the first layout 113, or display the content 112 for the interior decoration function and the second layout 114.

The processor 140 may enlarge or reduce the broadcast content 111 or the content 112 for the interior decoration function based on the user input received from the remote controller 10 and output the enlarged or reduced broadcast content 111 or content 112 for the interior decoration function on the display 130. In addition, the processor 140 may remove the first layout 113, or select only a portion of the second layout 114 and output the selected portion on the display 130. According to one embodiment, in response to the user input received from the remote controller 10, the processor 140 may change the broadcast content 111 to the content 112 for the interior decoration function or change the content 112 for the interior decoration function to the broadcast content 111, and output the changed content 112 for the interior decoration function or broadcast content 111 on the display 130.

The illuminance sensor 150 may measure illuminance around the display device 100. The measured illuminance value may be transmitted to the processor 140, and the processor 140 may adjust a brightness of the display 130 based on the measured illuminance value. For example, when the illuminance value is less than or equal to a predetermined level in a state in which the content 112 for the interior decoration function is being output, the processor 140 may reduce the brightness of the display 130. That is, when the user 20 does not watch the TV or the like via the display device 100, the brightness of the display 130 may be reduced to reduce power consumption of the display device 100.

The proximity sensor 160 may detect whether the user 20 is adjacent to the display device 100. A distance between the user 20 and the display device 100 may be transmitted to the processor 140, and the processor 140 may adjust the brightness of the display 130 based on the measured distance. For example, when the distance between the user 20 and the display device 100 is short in a state in which the content 112 for the interior decoration function is being output, the processor 140 may reduce the brightness of the display 130. In other words, when the user 20 enjoys the content 112 for the interior decoration function at a short distance, the brightness of the display 130 may be reduced to reduce the power consumption of the display device 100.

The speaker 170 may output various audio signals. In one embodiment, when the broadcast content 111 is being output, the speaker 170 may output an audio signal corresponding to the broadcast content 111. For example, when the TV program is being output, the speaker 170 may output a dialogue, OST, and the like. In another embodiment, when the content 112 for the interior decoration function is being output, specified music may be output. For example, when the picture is output through the display 130, the speaker 170 may output classical music corresponding to the picture.

Figure 3:
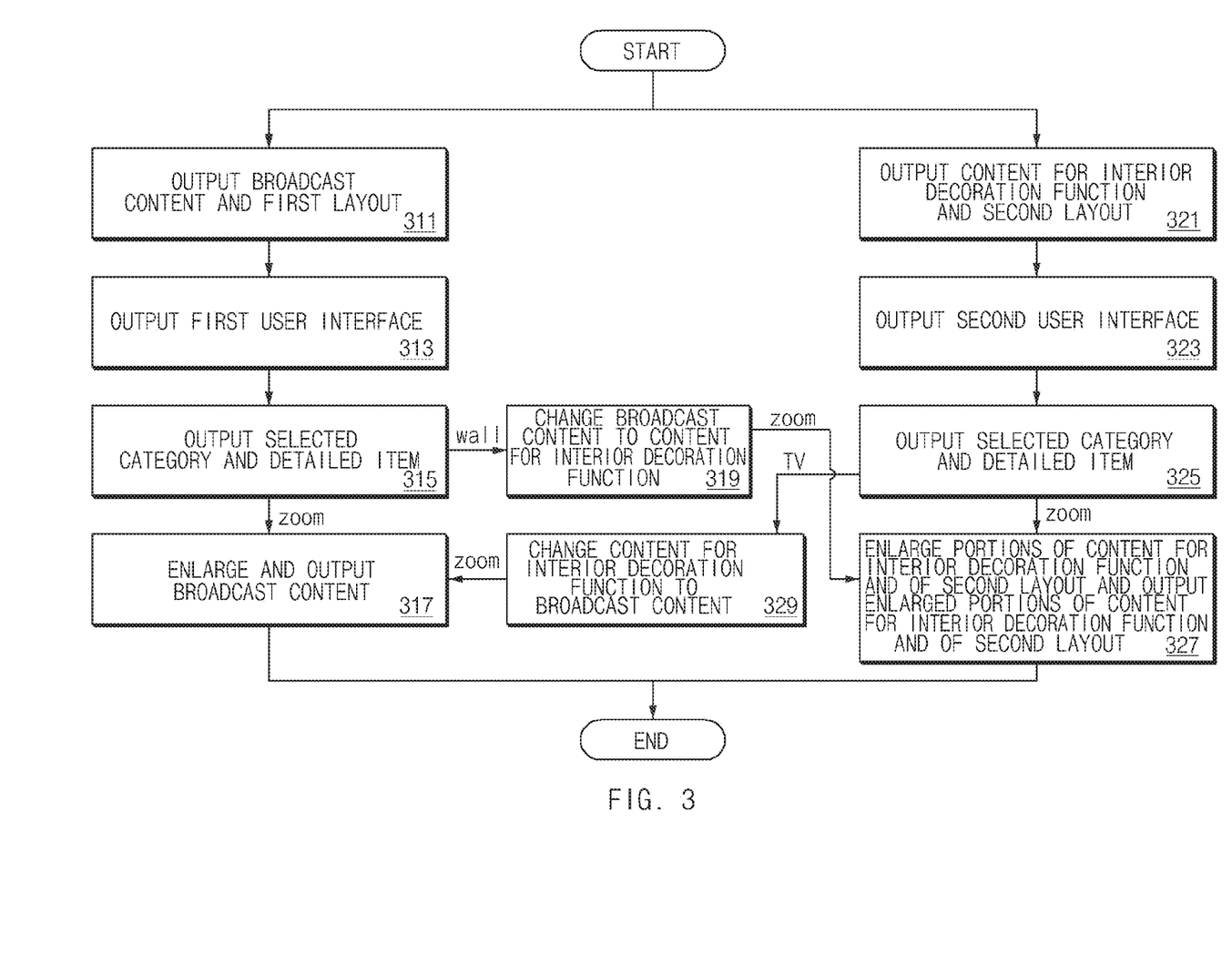
FIG. 3 illustrates an operation flowchart of a display device according to an embodiment.

FIG. 3 illustrates an operation flowchart of the display device 100 according to an embodiment. FIG. 3 illustrates an operation sequence of the display device 100 shown in FIG. 1. An embodiment illustrated in FIG. 3 is just one embodiment, and various embodiments of the disclosure are not limited to those illustrated in FIG. 3.

Referring to FIG. 3, in operation 311, the display device 100 may operate in the first mode 100a. That is, the display device 100 may output the broadcast content 111 and the first layout 113. For example, when the user 20 presses the first button 11 on the remote controller 10, the display device 100 may output the broadcast content 111 and the first layout 113.

In operation 313, the display device 100 may output a first user interface in which categories of the broadcast content 111 are listed. For example, when the user 20 presses the first button 11 in the first mode 100a, the display device 100 may output the first user interface. The categories of the broadcast content 111 may include a TV program, a movie, an application, and the like.

According to one embodiment, the first user interface may include detailed items included in each category. For example, when the category is the movie, the detailed items may include certain movies (e.g. Thor, Iron Man, Legends Of The Fall, and the like), and when the category is the application, the detailed items may include specific applications (e.g., YouTube™, Netflix™, and the like).

When the category and the detailed item are selected based on the user input, in operation 315, the display device 100 may output the selected detail item. For example, when the user 20 selects the movie called 'Thor', the display device 100 may receive and output a content of the selected movie from the external device (e.g., the set-top box).

In operation 317, the display device 100 may enlarge and output the broadcast content 111. For example, in operation 315, when the user 20 presses the third button 13 on the remote controller 10, the display device 100 removes the first layout 113, and enlarges and outputs the broadcast content 111. Therefore, the user 20 may enjoy the broadcast content 111 via a larger screen.

In operation 319, the display device 100 may change the broadcast content 111 to the content 112 for the interior decoration function. For example, in operation 315, when the user 20 presses the second button 12 on the remote controller 10, the display device 100 may change the broadcast content 111 to the content 112 for the interior decoration function and output the changed content 112 for the interior decoration function. In this case, the first layout 113 may be maintained, or the first layout 113 may be changed to the second layout 114.

In operation 327, the display device 100 may enlarge and output a portion of the content 112 for the interior decoration function and a portion of the second layout 114. For example, in operation 319, when the first layout 113 is changed to the second layout 114, and when the user 20 presses the third button 13 on the remote controller 10, the display device 100 may enlarge and output the portion of the content 112 and the portion (e.g., the edge image) of the second layout 114 for the interior decoration function. Thus, the user 20 may enjoy the content 112 for the interior decoration function through the larger screen.

In operation 321, the display device 100 may operate in the second mode 100b. That is, the display device 100 may output the content 112 for the interior decoration function and the second layout 114. For example, when the user 20 presses the second button 12 on the remote controller 10, the display device 100 may output the content 112 for the interior decoration function and the second layout 114.

In operation 323, the display device 100 may output a second user interface in which categories of the content 112 for the interior decoration function are listed. For example, when the user 20 presses the second button 12 in the second mode 100b, the display device 100 may output the second user interface. The categories of the content 112 for the interior decoration function may include a picture, a photo, media art, and the like.

According to one embodiment, the second user interface may include detailed items included in each category. For example, when the category is the picture, the detail items may be a picture of a specific artist, such as a mona lisa and a sunflower, and when the category is the photo, the detailed items may be a natural landscape or a family photo.

According to one embodiment, the second user interface may include various types of layouts. For example, the user 20 may select a form of the first layout 113 and/or the second layout 114 through the second user interface.

When the category and the detailed item of the content 112 for the interior decoration function, and the form of the second layout 114 are selected based on the user input, in operation 325, the display device 100 may combine the detailed item to the second layout 114 and output the combined detailed item and the second layout 114. For example, when the user 20 selects the family picture, the display device 100 may output a combination of the family picture and the second layout 114.

In operation 327, the display device 100 may enlarge and output the portion of the content 112 for the interior decoration function and the portion of the second layout 114. For example, in operation 325, when the user 20 presses the third button 13 on the remote controller 10, the display device 100 may enlarge and output the content 112 for the interior decoration function and the edge image. Thus, the user 20 may enjoy the content 112 for the interior decoration function through the larger screen.

In operation 329, the display device 100 may change the content 112 for the interior decoration function to the broadcast content 111. For example, when the user 20 presses the first button 11 on the remote controller 10 in operation 325, the display device 100 may change the content 112 for the interior decoration function to the broadcast content 111 and output the broadcast content 111. In this case, the second layout 114 may be maintained, or the second layout 114 may be changed to the first layout 113.

In operation 317, the display device 100 may enlarge and output the broadcast content 111. For example, in operation 329, when the user 20 presses the third button 13 on the remote controller 10, the display device 100 may remove the first layout 113 or the second layout 114, and enlarge and output the broadcast content 111. Therefore, the user 20 may enjoy the broadcast content 111 through the larger screen.

Figure 4:
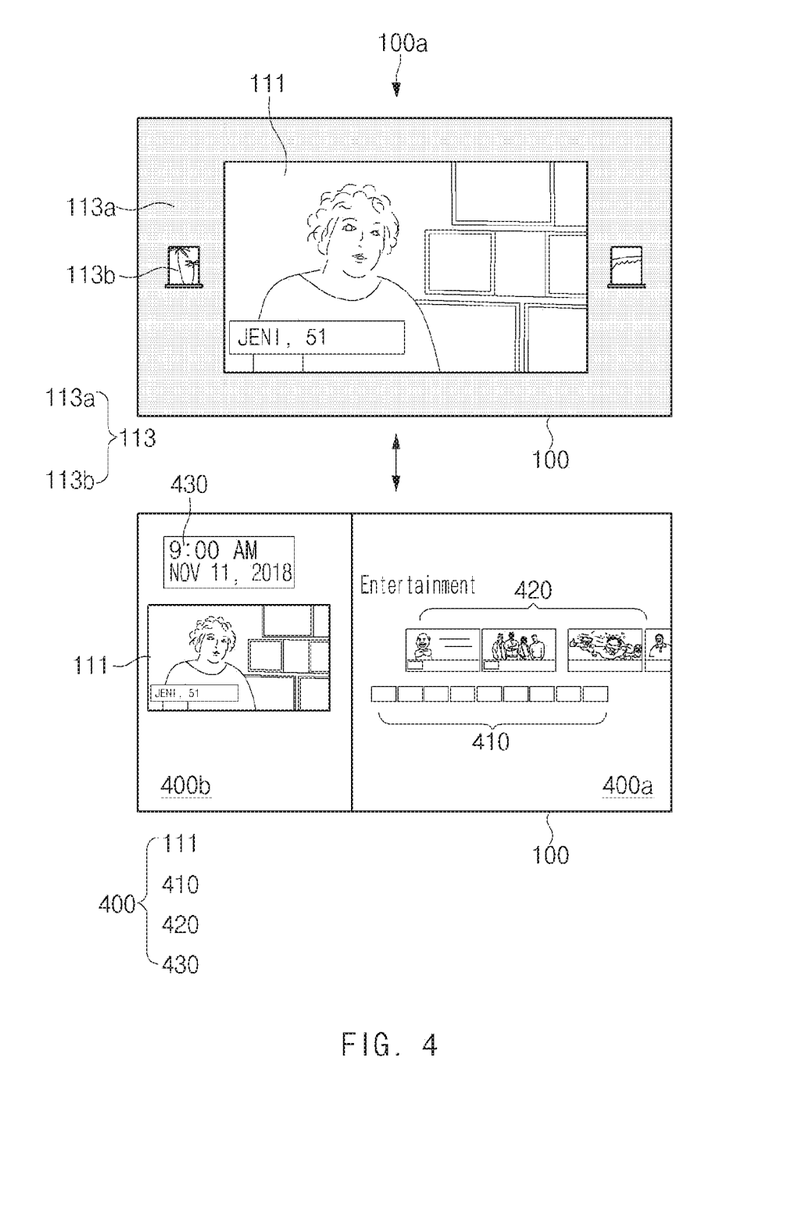
FIG. 4 illustrates a first user interface according to an embodiment.

FIG. 4 illustrates a first user interface according to an embodiment. FIG. 4 is a diagram for describing operations 311 and 313 shown in FIG. 3 in detail.

Referring to FIG. 4, the user 20 may change the category of the broadcast content 111 through a first user interface 400. For example, when the user 20 presses the first button 11 in the first mode 100*a*, the display device 100 may output the first user interface 400. The first user interface 400 may include categories 410 of the broadcast content 111, and the user 20 may select one of the categories 410. For example, the user 20 may select one of the TV programs, the movies, and the applications.

When the category of the broadcast content 111 is selected, the user 20 may select one of detailed items 420 of the broadcast content 111 through the first user interface 400. For example, when the category is the TV program, the user 20 may select one of sports channels, entertainment program channels, and drama channels. The selected detailed item may be output through the display device 100.

According to one embodiment, the first user interface 400 may include a first region 400*a* and a second region 400*b*. The first region 400*a* may refer to a region in which the categories 410 and the detailed items 420 are output. The second region 400*b* may refer to a region in which the detailed item selected by the user 20 is output. According to one embodiment, an image 430 containing a time and a date may be output in the second region 400*b*.

Figure 5:
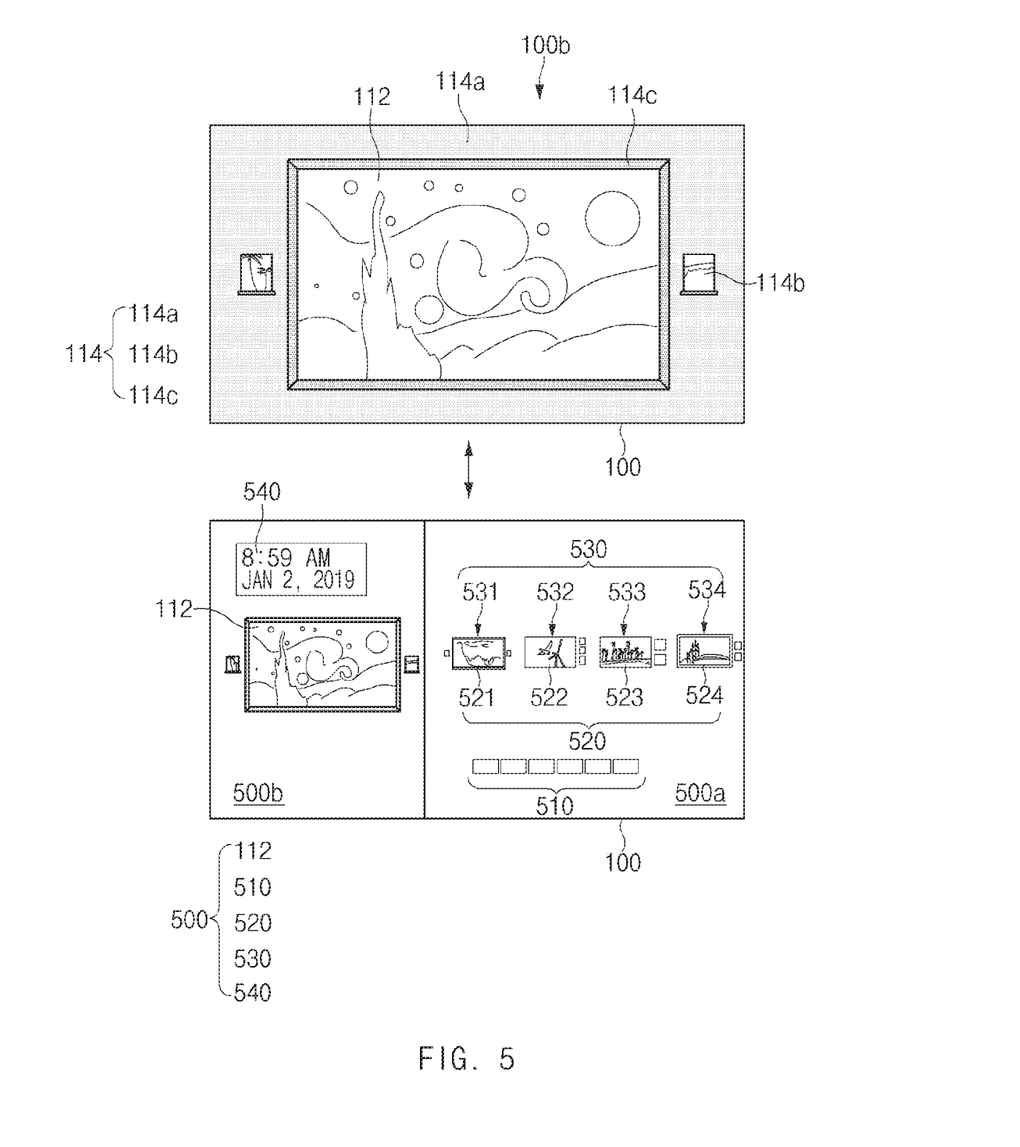
FIG. 5 illustrates a second user interface according to an embodiment.

FIG. 5 illustrates a second user interface according to an embodiment. FIG. 5 is a diagram for describing operations 321 and 323 illustrated in FIG. 3 in detail.

Referring to FIG. 5, the user 20 may change the category of the content 112 for the interior decoration function through a second user interface 500. For example, when the user 20 presses the second button 12 in the second mode 100*b*, the display device 100 may output the second user interface 500. The second user interface 500 may include categories 510 of the content 112 for the interior decoration function, and the user 20 may select one of the categories 510. For example, the user 20 may select one of the picture, the photo, and the media art.

When the category of the content 112 for the interior decoration function is selected, the user 20 may select one of detailed items 520 of the content 112 for the interior decoration function through the second user interface 500. For example, when the category is the picture, the user 20 may select one of a first picture 521, a second picture 522, a third picture 523, and a fourth picture 524. The selected detailed item may be output through the display device 100.

According to one embodiment, the user 20 may change the first layout 113 and/or the second layout 114 through the second user interface 500. For example, the user 20 may select one of a layout a 531, a layout b 532, a layout c 533, and a layout d 534 through the second user interface 500. Colors of background images contained in the layout a 531, the layout b 532, the layout c 533, and the layout d 534, arrangements of frame images, and the like may be different from each other. When one of the layout a 531, the layout b 532, the layout c 533, and the layout d 534 is selected, the display device 100 may output a combination of the selected layout and a detailed item.

According to one embodiment, the first user interface 400 may include a first region 500*a* and a second region 500*b*. The first region 500*a* may refer to a region in which forms of the categories 510, the detailed items 520, and layouts 530 are output. The second region 500*b* may refer to a region in which a detailed item selected by the user 20 is output. According to one embodiment, an image 540 containing a time and a date may be output in the second region 500*b*.

Figure 6:
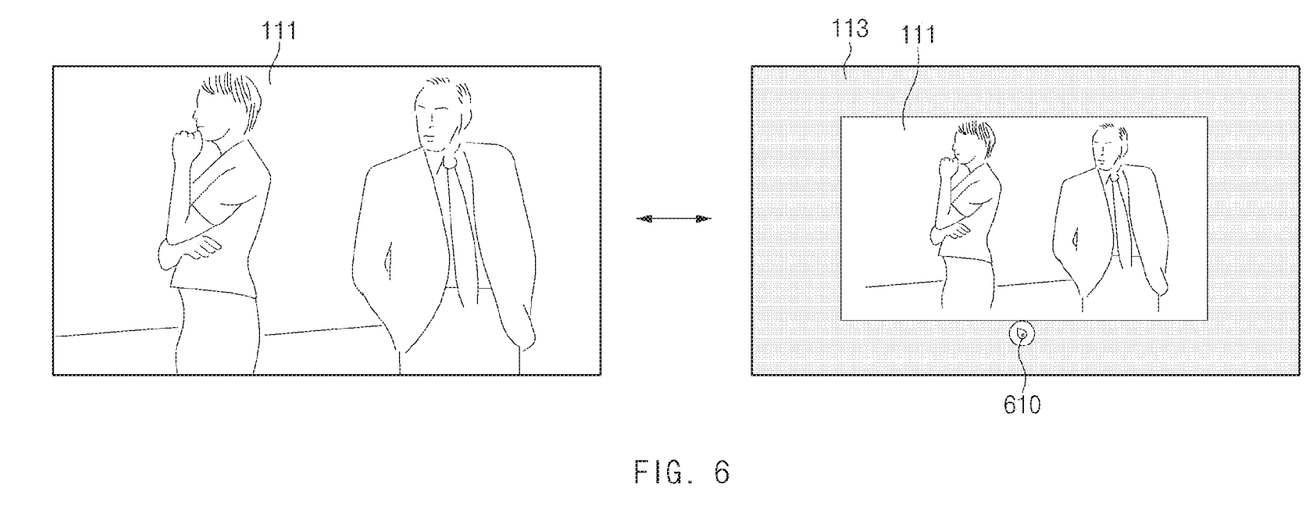
FIG. 6 illustrates a display device for reducing a size of a broadcast content when outputting an icon according to an embodiment.

FIG. 6 illustrates a display device for reducing a size of a broadcast content when outputting an icon according to an embodiment.

Referring to FIG. 6, when a user input for executing a specific function is received while the broadcast content 111 is being outputted, the display device 100 may reduce a size of the broadcast content 111. The first layout 113 may be output around the reduced broadcast content 111, and an icon 610 corresponding to the specific function may be output on the first layout 113. For example, when the user 20 presses a voice input button on the remote controller 10, the display device 100 may operate based on a voice input. In this case, the display device 100 may reduce the size of the broadcast content 111, and output the icon 610 corresponding to the voice input on the first layout 113.

FIG. 6 illustrates that the size of the broadcast content 111 decreases when the voice input function is executed, but various embodiments disclosed in the disclosure are not limited to those shown in FIG. 6. For example, even when a subtitle playback, a screen brightness control, a Bluetooth connection function, or the like is executed, the display device 100 may reduce the size of the broadcast content 111 and output the icon 610 corresponding to the executed function.

Figure 7:
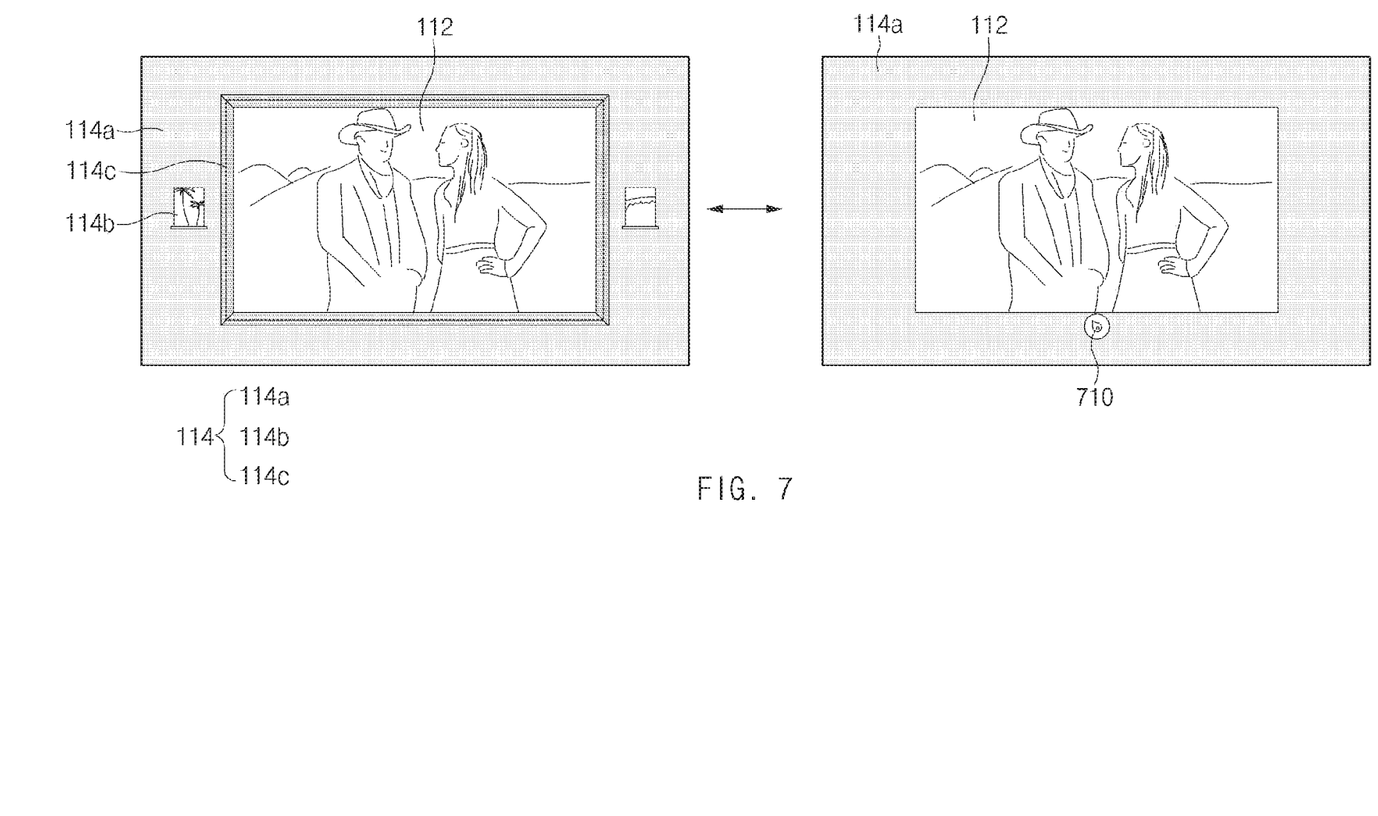
FIG. 7 illustrates a display device for removing a portion of a second layout when outputting an icon according to an embodiment

FIG. 7 illustrates a display device for removing a portion of a second layout when outputting an icon according to an embodiment.

Referring to FIG. 7, the display device 100 may remove a portion of the second layout 114 when a user input for executing a specific function is received in the second mode 100b. An icon 710 corresponding to the specific function may be output on the second layout 114, which has been partially removed. For example, when the user 20 presses the voice input button on the remote controller 10, the display device 100 may operate based on the voice input. In this case, the display device 100 may remove the portion (e.g., the frame image 114b and the edge image 114c) of the second layout 114, and output the icon 710 corresponding to the voice input on the second layout 114.

FIG. 7 illustrates that the portion of the second layout 114 is removed when the voice input function is executed, but various embodiments disclosed in the disclosure are not limited to those shown in FIG. 7. For example, even when the subtitle playback, the screen brightness control, the Bluetooth connection function, or the like is executed, the display device 100 may remove the portion (e.g., the frame image 114b and the edge image 114c) of the second layout 114, and output the icon 710 corresponding to the function on the second layout 114.

The display device according to an embodiment of the disclosure may include a display device including a display for outputting a broadcast content or a content for an interior decoration function, a memory for storing a first layout for surrounding the broadcast content and a second layout for surrounding the content for the interior decoration function, and a processor operatively connected to the display and the memory, wherein the processor may remove the first layout, enlarge the broadcast content, and output the enlarged broadcast content through the display when a first user input for enlarging the broadcast content is received in a first mode outputting the broadcast content and the first layout through the display, and enlarge portions of the content for the interior decoration function and of the second layout and output the enlarged portions of the content for the interior decoration function and of the second layout through the display when a second user input for enlarging the content for the interior decoration function is received in a second mode outputting the content for the interior decoration function and the second layout through the display.

The processor according to an embodiment of the disclosure may change the broadcast content to the content for the interior decoration function in the first mode, and output the content for the interior decoration function through the display.

The processor according to an embodiment of the disclosure may output a user interface in the first mode, wherein categories of the broadcast content may be listed in the user interface.

The processor according to an embodiment of the disclosure may select one of the categories of the broadcast content and one of detailed items included in the selected category through the user interface, and output the selected detailed item through the display.

The processor according to an embodiment of the disclosure may change the content for the interior decoration function to the broadcast content in the second mode, and output the broadcast content through the display.

The processor according to an embodiment of the disclosure may output a user interface in the second mode, wherein categories of the content for the interior decoration function may be listed in the user interface.

The processor according to an embodiment of the disclosure may select one of the categories of the content for the interior decoration function and one of detailed items included in the selected category through the user interface, and output the selected detailed item through the display.

The user interface according to an embodiment of the disclosure may include a plurality of layouts, and the processor may select one of the plurality of layouts, combine the selected detailed item with the selected layout, and output the combination of the selected detailed item and the selected layout through the display.

The display device according to an embodiment of the disclosure may further include a speaker for outputting an audio signal, and the processor may output an audio signal corresponding to the content for the interior decoration function through the speaker in the second mode.

The display device according to an embodiment of the disclosure may further include an illuminance sensor for measuring an external illuminance, and the processor may reduce brightness of the content for the interior decoration function and the second layout in the second mode when the external illuminance is lower than a predetermined brightness.

The display device according to an embodiment of the disclosure may further include a proximity sensor for measuring a distance between the display device and a user, and the processor may reduce brightness of the content for the interior decoration function and the second layout in the second mode when the distance is equal to or less than a predetermined value.

The second layout according to an embodiment of the disclosure may include an edge image for surrounding the content for the interior decoration function, and the processor may enlarge the content for the interior decoration function and the edge image, and output the enlarged content for the interior decoration function and edge image through the display.

A display device according to an embodiment of the disclosure may include a display for outputting a broadcast content or a content for an interior decoration function, a memory for storing a layout forming a background of the broadcast content and of the content for the interior decoration function, and a processor operatively connected to the display and the memory, wherein the processor may remove the layout, enlarge the broadcast content, and output the enlarged broadcast content through the display when a first user input for enlarging the broadcast content is received in a first mode outputting the broadcast content and the layout through the display, and remove a portion of the layout, enlarge a portion of the content for the interior decoration function and a portion of the remaining layout, and output the enlarged portions of the content for the interior decoration function and of the remaining layout through the display when a second user input for enlarging the content for the interior decoration function is received in a second mode outputting the content for the interior decoration function and the layout through the display.

The layout according to an embodiment of the disclosure may include an edge image for surrounding the broadcast content and the content for the interior decoration function, and the processor may enlarge the edge image and output the enlarged edge image through the display.

The display device according to an embodiment of the disclosure may further include a communication circuit for receiving the broadcast content from a set-top box, and receiving the content for the interior decoration function from a user terminal or a camera device.

The processor according to an embodiment of the disclosure may change the broadcast content to the content for the interior decoration function in the first mode, and output the content for the interior decoration function through the display.

The processor according to an embodiment of the disclosure may change the content for the interior decoration function to the broadcast content in the second mode, and output the broadcast content through the display.

The display device according to an embodiment of the disclosure may further include a speaker for outputting an audio signal, and the processor may output an audio signal corresponding to the content for the interior decoration function through the speaker in the second mode.

The display device according to an embodiment of the disclosure may further include an illuminance sensor for measuring an external illuminance, and the processor may reduce brightness of the content for the interior decoration function and the layout in the second mode when the external illuminance is lower than a predetermined brightness.

The display device according to an embodiment of the disclosure may further include a proximity sensor for measuring a distance between the display device and a user, and the processor may reduce brightness of the content for the interior decoration function and the layout in the second mode when the distance is equal to or less than a predetermined value.

The display device according to various embodiments may be one of various types of display devices. The display devices may include, for example, a TV, a portable communication device (e.g., a smartphone), a computer device, a portable multimedia device, a portable medical device, a camera, a wearable device, or a home appliance. According to an embodiment of the disclosure, the display devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium or in an external memory that is readable by a machine. For example, a processor of the machine may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" simply means a tangible device, and does not include a signal (e.g., an electromagnetic wave), but this term does not differentiate between where data is semi-permanently stored in the storage medium and where the data is temporarily stored in the storage medium. For example, "non-transitory storage medium may include a buffer in which data is storage temporarily.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product (e.g., downloadable app) may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments disclosed in the disclosure, the display device may be utilized for various purposes.

In addition, various effects that are identified directly or indirectly through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display apparatus comprising:
   a display configured to output a broadcast content or a content for an interior decoration function;
   a memory configured to store a first layout for surrounding the broadcast content and a second layout for surrounding the content for the interior decoration function; and
   at least one processor operatively connected to the display and the memory,
   wherein the at least one processor is configured to:
   based on receiving a first user input to enlarge the broadcast content in a first mode outputting the broadcast content and the first layout through the display, remove the first layout, enlarge the broadcast content, and output the enlarged broadcast content through the display; and
   based on receiving a second user input to enlarge the content for the interior decoration function in a second mode outputting the content for the interior decoration function and the second layout through the display, enlarge portions of the content for the interior decoration function and portions of the second layout and output the enlarged portions of the content for the interior decoration function and the enlarged portions of the second layout through the display.

2. The display apparatus of claim 1, wherein the at least one processor is configured to change the broadcast content to the content for the interior decoration function in the first mode, and output the content for the interior decoration function through the display.

3. The display apparatus of claim 1, wherein the at least one processor is configured to output a user interface in the first mode, wherein categories of broadcast content are listed in the user interface.

4. The display apparatus of claim 3, wherein the at least one processor is configured to: select one of the categories of broadcast content and one of detailed items included in the selected category through the user interface; and output the selected detailed item through the display.

5. The display apparatus of claim 1, wherein the at least one processor is configured to change the content for the interior decoration function to the broadcast content in the second mode, and output the broadcast content through the display.

6. The display apparatus of claim 1, wherein the at least one processor is configured to output a user interface in the second mode, wherein categories of content for the interior decoration function are listed in the user interface.

7. The display apparatus of claim 6, wherein the at least one processor is configured to: select one of the categories of content for the interior decoration function and one of detailed items included in the selected category through the user interface; and output the selected detailed item through the display.

8. The display apparatus of claim 7, wherein the user interface includes a plurality of layouts, and
   wherein the at least one processor is configured to:
   select one of the plurality of layouts;
   combine the selected detailed item with the selected layout; and
   output the combination of the selected detailed item and the selected layout through the display.

9. The display apparatus of claim 1, further comprising:
   a speaker configured to output an audio signal,
   wherein the at least one processor is configured to output an audio signal corresponding to the content for the interior decoration function through the speaker in the second mode.

10. The display apparatus of claim 1, further comprising:
    an illuminance sensor configured to measure an external illuminance,
    wherein the at least one processor is configured to reduce brightness of the content for the interior decoration function and the second layout in the second mode based on that the external illuminance is lower than a predetermined brightness.

11. The display apparatus of claim 1, further comprising:
    a proximity sensor configured to measure a distance between the display apparatus and a user,
    wherein the at least one processor is configured to reduce brightness of the content for the interior decoration function and the second layout in the second mode when the measured distance is less than or equal to a predetermined value.

12. The display apparatus of claim 1, wherein the second layout includes an edge image for surrounding the content for the interior decoration function, and
    wherein the at least one processor is configured to enlarge the content for the interior decoration function and the edge image, and output the enlarged content for the interior decoration function and edge image through the display.

13. A display apparatus comprising:
    a display configured to output a broadcast content or a content for an interior decoration function;
    a memory configured to store a first layout for surrounding the broadcast content and a second layout for surrounding the content for the interior decoration function; and
    at least one processor operatively connected to the display and the memory,
    wherein the at least one processor is configured to:
    based on receiving a first user input to enlarge the broadcast content in a first mode outputting the broadcast content and the first layout through the display, remove the first layout, enlarge the broadcast content, and output the enlarged broadcast content through the display; and
    based on receiving a second user input to enlarge the content for the interior decoration function in a second mode outputting the content for the interior decoration function and the second layout through the display, remove a portion of the second layout, enlarge a portion of the content for the interior decoration function and a portion of the remaining second layout, and output the enlarged portions of the content for the interior decoration function and of the remaining second layout through the display.

14. The display apparatus of claim 13, wherein the layout includes an edge image for surrounding the broadcast content and the content for the interior decoration function, and
    wherein the at least one processor is configured to enlarge the edge image and output the enlarged edge image through the display.

15. The display apparatus of claim 13, further comprising:
    a communication circuit for receiving the broadcast content from a set-top box, and receiving the content for the interior decoration function from a user terminal or a camera apparatus.

16. The display apparatus of claim 13, wherein the at least one processor is configured to change the broadcast content to the content for the interior decoration function in the first mode, and output the content for the interior decoration function through the display.

17. The display apparatus of claim 13, wherein the at least one processor is configured to change the content for the interior decoration function to the broadcast content in the second mode, and output the broadcast content through the display.

18. The display apparatus of claim 13, further comprising:
a speaker configured to output an audio signal,
wherein the at least one processor is configured to output an audio signal corresponding to the content for the interior decoration function through the speaker in the second mode.

19. The display apparatus of claim 13, further comprising:
an illuminance sensor configured to measure an external illuminance,
wherein the at least one processor is configured to reduce brightness of the content for the interior decoration function and the second layout in the second mode when the external illuminance is lower than a predetermined brightness.

20. The display apparatus of claim 13, further comprising:
a proximity sensor configured to measure a distance between the display apparatus and a user,
wherein the at least one processor is configured to reduce brightness of the content for the interior decoration function and the second layout in the second mode when the distance is equal to or less than a predetermined value.

\* \* \* \* \*